May 13, 1930.  C. C. WALLACE  1,758,545
VENT FOR STORAGE BATTERIES
Filed April 30, 1928
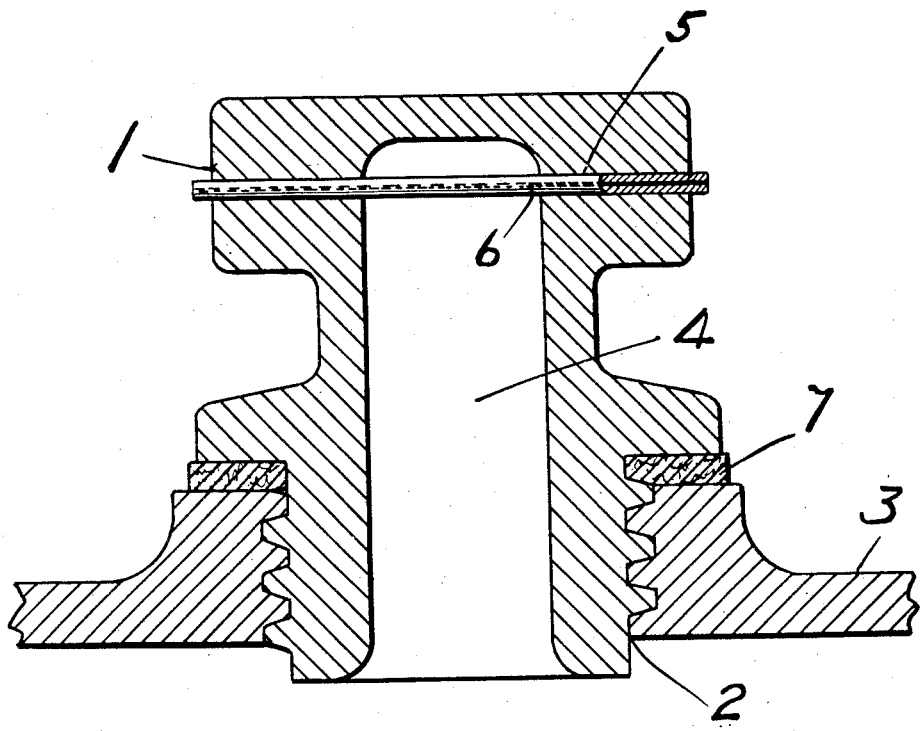
WITNESS:
INVENTOR
Curtis C. Wallace
BY
Augustus B. Stoughton
ATTORNEY.

Patented May 13, 1930

1,758,545

UNITED STATES PATENT OFFICE

CURTIS C. WALLACE, OF PHILADELPHIA, PENNSYLVANIA

VENT FOR STORAGE BATTERIES

Application filed April 30, 1928. Serial No. 273,834.

My invention relates to a vent for a storage battery cell, in which the plates have been fully charged and from which the electrolyte has been removed, and the object of my invention is to provide a vent which will allow the escape of the gases which may be developed in the cell while standing on open circuit in a charged and dumped condition but prevent or retard the diffusion of air into the cell.

It is known that when a battery of the lead acid type is standing on open circuit in a charged condition after the electrolyte has been removed, a certain amount of hydrogen gas will be developed in the cell due to the gradual combination between the active material of the negative plates and the acid remaining in the plates and in the wood separators. Due to the limited amount of acid in the cell after dumping, this effect is of minor importance and the plates will retain a very considerable proportion of their full charge for a long period of time provided they are kept from contact with the external air. If however air has free access to the plates in the presence of moisture, the active material of the negative plates will rapidly oxidize and the plates become discharged.

In accordance with my invention, I provide a vent which is simple and inexpensive and is readily applied and from which the element which restricts the diffusion of air into the cell can easily be removed when the cell is put into service, so as to allow the free escape of gas during the charging period. Gases are generated during the charge period at a rate very much greater than the very low rate at which gas is developed when the battery is standing on open circuit after being dumped. A vent which will provide for the escape of the small amount of gas developed while standing on open circuit if it is sufficiently restricted to prevent the diffusion of air into the cell, may be too small to allow for the escape of gas at the end of an ordinary charge without developing excessive and damaging pressures.

In the accompanying drawing is shown in vertical section a vent plug for the cover of a storage cell embodying one form of my invention.

In this drawing, 1 is a usual form of vent plug held in place in the opening 2 of the cell cover 3 in the usual manner. A gasket 7, of soft rubber may be employed between the flange of the vent plug and the upper surface of the cover. This plug is provided with an internal cavity 4 communicating at the bottom with the interior of the cell and at the top with the external air through a horizontal duct 5, which may be a hole drilled horizontally through the top of the plug. This hole is of sufficient diameter to permit the escape of gas during the end of a normal charge but is too large to prevent rapid diffusion of air into the interior of the cell when the cell is standing on open circuit in a charged and dumped condition. To prevent such diffusion under these conditions, I have shown inserted in this hole 5 a piece of rubber tubing 6 of suitable diameter to practically fill the hole 5. This rubber tubing may be designed to accomplish the purpose of my invention in either of two ways. It may be made with walls sufficiently thin so that upon the development of internal pressure in the cell, the walls will slightly collapse, affording a passage for the escape of the gas between the exterior walls of the tube and the interior walls of the hole through the vent plug. However, after the internal pressure has been relieved by the escape of gas, the tube will expand again and fill the hole, thus preventing diffusion of air into the cell.

By the second method, the tube may be made with comparatively rigid walls but of such diameter that it fills the hole without exerting excessive pressure against the walls thereof, and the irregularities in the internal surface of the hole and in the external surface of the rubber tubing will provide capillary passages sufficient to permit the escape of the gas that may be developed in the cell while standing on open circuit but of so minute section that the diffusion of air into the cell is practically prevented.

When the battery is put into service, after being filled with electrolyte, it is no longer necessary to maintain the restricted vent and the tube 6 is therefore removed by one of its projecting ends, thus leaving the full sized opening 5 free to permit the escape of gas during a normal charge.

I claim:

1. Venting means for a storage battery cell in a charged and dumped condition having a venting duct adapted to vent the gases evolved during a normal charge and a removable filling piece of pliable material imperfectly filling the duct and adapted to provide passage between its surface and the inner wall of the duct for venting the gases developed by local action but to retard diffusion of air into the cell.

2. Venting means for a storage battery cell in a charged and dumped condition having a venting duct adapted to vent the gases evolved during a normal charge and a removable piece of rubber tubing imperfectly filling the duct and adapted to provide passage only between its outer walls and the inner walls of the duct for venting the gases developed by local action but retard diffusion of air into the cell.

3. Venting means for a storage battery cell in a charged and dumped condition having a venting duct adapted to vent the gases evolved during a normal charge and a removable filling piece imperfectly filling the duct and adapted to provide passage between its surface and the inner wall of the duct for venting the gases developed by local action but to retard diffusion of air into the cell.

CURTIS C. WALLACE.